(12) United States Patent
Ahn

(10) Patent No.: US 6,931,895 B1
(45) Date of Patent: Aug. 23, 2005

(54) THEFT PREVENTION DEVICE FOR INFORMATION-STORED DISK

(76) Inventor: Jae-Yeon Ahn, 475-12, Bangbae2-Dong, Seocho-Ku, Seoul-shi 137-062 (KR)

( * ) Notice: Subject to any disclaimer, the term of this patent is extended or adjusted under 35 U.S.C. 154(b) by 0 days.

(21) Appl. No.: 09/622,904

(22) PCT Filed: Mar. 4, 1999

(86) PCT No.: PCT/KR99/00100

§ 371 (c)(1),
(2), (4) Date: Oct. 23, 2000

(87) PCT Pub. No.: WO99/44480

PCT Pub. Date: Sep. 10, 1999

(30) Foreign Application Priority Data

| Mar. 5, 1998 | (KR) | 1998-7341 |
| Jul. 1, 1998 | (KR) | 1998-26475 |

(51) Int. Cl.$^7$ .......................................... E05B 65/00
(52) U.S. Cl. ................ 70/57.1; 206/1.5; 206/308.1; 206/387.1; 70/63
(58) Field of Search .................... 70/57.1, 63; 206/1.5, 206/307, 308.1, 308.2, 387.1, 387.11

(56) References Cited

U.S. PATENT DOCUMENTS

| 4,022,322 | A | * | 5/1977 | Louzil | 206/387 |
| 4,561,544 | A | * | 12/1985 | Reeve | 206/540 |
| 4,819,797 | A | * | 4/1989 | Holmgren | 206/309 |
| 5,209,086 | A | * | 5/1993 | Bruhwiler | 70/57.1 |
| 5,289,914 | A | * | 3/1994 | Holmgren | 206/1.5 |
| 5,375,712 | A | * | 12/1994 | Weisburn | 206/387 |
| 5,385,235 | A | * | 1/1995 | Ikebe et al. | 206/308.1 |
| 5,390,515 | A | * | 2/1995 | Essick | 70/57.1 X |
| 5,524,752 | A | * | 6/1996 | Mazzucchelli | 206/308.2 |
| 5,636,535 | A | * | 6/1997 | Shimada | 70/57.1 |
| 5,680,782 | A | * | 10/1997 | Komatsu et al. | 70/57.1 |

(Continued)

FOREIGN PATENT DOCUMENTS

JP 8-266380 10/1996

(Continued)

OTHER PUBLICATIONS

English Language abstract of JP-8-266380.

(Continued)

*Primary Examiner*—Suzanne Dino Barrett
(74) *Attorney, Agent, or Firm*—Greenblum & Bernstein, P.L.C.

(57) ABSTRACT

A burglar proof apparatus is provided, wherein locking and unlocking devices are provided within the storage case so that the storage case may not be opened unless the unlocking device is used, whereby burglary can be reliably prevented. The apparatus includes a case body wherein a housing space is formed for the data storage disk and a lock groove is formed on both outer sides thereof, a disk holder including a plurality of guide rails for insertion into the lock groove of the case body, formed on both inner sides thereof, for supporting and housing a width of the data storage disk, and a locking means for controlling the assembly of the disk holder and the case body, including a hanger piece of a protrusion disposed on an inner face of the lock groove, and a leaf spring disposed between guide rails of the disk holder for locking the hanger piece in a through hole.

9 Claims, 12 Drawing Sheets

U.S. PATENT DOCUMENTS

| | | | |
|---|---|---|---|
| 5,701,997 A | * 12/1997 | O'Brien et al. | 206/308.1 |
| 5,718,332 A | * 2/1998 | Tachibana | 206/308.2 |
| 5,901,840 A | * 5/1999 | Nakasuji | 206/1.5 |
| 5,934,114 A | * 8/1999 | Weisburn et al. | 70/57.1 |
| 5,956,981 A | * 9/1999 | Weisburn et al. | 70/57.1 |
| 5,988,376 A | * 11/1999 | Lax | 206/308.2 |
| 6,202,454 B1 | * 3/2001 | Nakasuji | 70/57.1 |
| 6,430,976 B1 | * 8/2002 | Mitsuyama | 70/57.1 |
| 6,547,066 B2 | * 4/2003 | Koch | 206/308.1 |

FOREIGN PATENT DOCUMENTS

JP  9-183477  7/1997

OTHER PUBLICATIONS

English Language abstract of JP 9-183477.

* cited by examiner

THEFT PREVENTION DEVICE FOR INFORMATION-STORED DISK

TECHNICAL FIELD

The present invention relates to theft prevention devices for preventing burglary of a data storage disk housed in a storage case; and more particularly, to a prevention device, wherein locking and unlocking devices are provided within the storage case so that the storage case is unable to be opened unless the unlocking device is used, whereby burglary can be prevented reliably.

BACKGROUND ART

A case equipped with a simple-designed opening and shutting device, is generally used to prevent a damage of an information storage media, e.g., a video tape, a compact disk, a cassette tape and a floppy disk, from outside impact, and is used to protect an information storage portion of the disk. Since this case has a structure of easily being opened and shut by anybody, lots of burglaries occur in which the disk is pilfered from the storage case in a disk store or in a store that lends or rents disks. Therefore, it is necessary to prevent the burglary as aforementioned.

To prevent the burglary of the information storage media, the conventional storage case having a locking member is proposed. A structure of the conventional storage case is illustrated briefly as referred to FIG. 1.

As described in FIG. 1, the locking member comprises a housing space 32 for housing the disk, housing grooves 33 formed on exterior faces of both ends, a case body 31 in which a guide real groove 33B is formed on one side of the housing groove 33, a disk holder 36 having a long rail 34 in a lengthwise direction for being inserted into the housing groove 33 and the guide rail groove 33B of the case body 31, a through hole 33A formed inside the housing groove 33, and a leaf spring 35 disposed inside the rail 34 of the disk holder 36.

Here, a fixed protrusion 34A is formed on one side of the rail 34 and a fixed hole 35B corresponding to the fixed protrusion 34A is formed on the leaf spring 35 for coupling with the fixed protrusion 34A. Two hanger pieces 35A, which are formed by cutting the three adjacent lines of the leaf spring 35 and protruding the cut pieces, has a predetermined distance capable of coupling with the through hole 33A. At this time, the hanger pieces have a structure that a protrusion direction of the hanger pieces 35A is in opposite to the direction that disk holder 36 is inserted into the case body 31. Thus, in case of coupling the guide rail 34 with the housing hole 33 while the data storage disk case is housed in the case body 31, the hanger pieces 35A of the leaf spring 35 is coupled with the through hole 33A so that the disk holder 36 is not separated even if the disk holder 36 is pulled.

Referring to FIG. 2, there is shown a schematic view of an unlocking device to unlock the locking device of the conventional storage case.

As described in FIG. 2, the unlocking device includes a key block 41 in which a first housing groove 41A is formed for housing a width of the data storage disk, and a magnet 42 are mounted in both end sides of the housing groove 41A of the key block 41. Since the key block has a stepped structure which enables for the first housing groove 41A to house a single case or a double case respectively and there is also a second housing groove 41B formed in a bottom portion for housing a tape case, it is possible for unlocking according to the width of the case.

If the storage case is inserted into the key block 41 of the unlocking device as aforementioned, the magnet 42 pulls the leaf spring 35 due to a magnetic force so that the locking is unlocked by separating the hanger pieces 35A from the through hole 33A.

Mechanisms for locking in and unlocking the disk holder 36 from the case body 31, are illustrated briefly as follows referring to FIGS. 3A and 3B.

As described in FIG. 3A, since the hanger pieces 35A of the leaf spring 35 are coupled with the through hole 33 of the case body 31, the disk holder 36 is locked not being separated even if it is pulled or pushed.

However, if the case is inserted into the first housing groove 41A of the key block 41 as described in FIG. 3B, the hanger pieces 35A of the leaf spring 35 are separated from the through hole 33A of the housing groove 33 because the leaf spring is pulled by the magnetic force of the magnet 42. In this state, a user pulls the case body 31 for unlocking the case on gripping the disk holder 36.

As mentioned, the conventional burglarproof apparatus has locking and unlocking devices and the structure has hanger pieces 35A on a leaf spring 35 made by being cut and protruded. And the hanger pieces 35A are coupled with the through hole of the housing groove in a locking state and are separated from the hole in an unlocking state. That is, the fixed hole 35B, which is formed on one side of the leaf spring 35, is fixed by being inserted into the fixed protrusion of the guide rail 34 and the hanger pieces 35A on the other side of the leaf spring 35 are disposed at a predetermined distance from an inner side of the leaf spring 35. Hence, occasionally, hanger pieces 35A of the leaf spring 35 are broken and bent backward upon pulling the case body from the disk holder with a compulsive force.

Therefore, if the hanger pieces 35A are not completely separated from the through hole 33A by the magnetic force of the magnet 12 in detaching the disk holder 6 from the case body 1, the hanger pieces 35A are bended backward or the leaf spring 35 itself is bended backward by the force which the user pulls the case body from the disk holder. Thus, a moveable space is reduced and the locking function of the hanger pieces is lost so that the unlocking function cannot operate eventually.

Moreover, when the locking device is intended to be unlocked, the user pulls the case body with one hand on gripping the disk holder with the other hand so that it is difficult for the user to open and shut the case body. There is also a drawback that the locking device is easily unlocked by twisting a cover owing to a weak reinforcement force, which the guide rail groove of the case body surrounds only the upper portion of the rail of the disk holder.

DISCLOSURE OF INVENTION

It is, therefore, an object of the present invention to provide a burglarproof apparatus for a data storage disk, wherein a locking and an unlocking is operated without a miss so that the locking and the unlocking operation are reliable, by forming a through hole on a leaf spring and adopting a locking device of which a structure has hanger pieces therein.

In accordance with an embodiment of the present invention, there is provided a burglarproof apparatus for a data storage disk, comprising: a case body wherein a housing space is formed for the data storage disk and a lock groove is formed on both outer sides thereof; a disk holder including a plurality of guide rails for being inserted into the lock groove of the case body, formed on both inner side thereof, for supporting and housing a width of the data storage disk; and a locking means for controlling to combine the disk holder into the case body, including a hanger piece of a protrusion disposed on an inner face of the lock groove, and a leaf spring disposed between guide rails of the disk holder for locking the hanger piece in a through hole.

In accordance with another embodiment of the present invention, there is provided a burglarproof apparatus for a data storage disk, having a case body forming a housing space therein, a disk holder for supporting and housing a width of the data storage disk, and a storage case equipped with a locking means for controlling to combine the disk holder into the case body, comprising: a key block in which a housing groove is formed, for a width of the disk holder being inserted; a magnet, disposed in both sides of the housing groove of the key block corresponding to the width of the disk holder, for unlocking by supplying a pulling force to the locking means when the disk holder is inserted; and an unlocking pin, formed in a shape of a protrusion, disposed on a front face of the housing groove of the key block having the direction that the disk holder is inserted, for supporting the case body when the case body is separated from the disk holder being pressed by an external force.

In accordance with further another embodiment of the present invention, there is provided a burglarproof apparatus for a data storage disk, comprising: a case body in which a housing space is formed, guide rails are formed on one side of both parts and a lock groove formed on the both faces of the guide rails; a disk holder in which rail grooves are formed on both sides corresponding to the guide rails for coupling the case body and a plurality of slots formed on one side of inside the guide rails; and a locking means for controlling to combine the disk holder into the case body, including a first combination piece formed inside the lock groove and a second combination piece formed inside the rail groove for being attached on and detached from the first hanger piece.

In accordance with still another embodiment of the present invention, there is provided a burglarproof apparatus for data storage disk, comprising: a case body in which a housing space is formed, guide rails are formed on parts of both sides thereof and lock groove formed on the both faces of the guide rails; a disk holder in which rail grooves are formed on both sides corresponding to the guide rails for coupling the case body and a plurality of slots formed on one side of inside the guide rails; a locking means for controlling to combine the disk holder into the case body, including a hanger protrusion formed inside the lock groove one side thereof and a leaf spring formed inside the rail groove for being attached on and detached from the first hanger piece on another side thereof; a key block including a housing groove of a width of the disk holder being inserted; a magnet, disposed in both sides of the housing groove of the key block corresponding to the width of the disk holder, for unlocking by supplying a pulling force to the locking means when the disk holder is inserted; and a supporting means for supporting the case body when the case body is separated from the disk holder being pressed by an external force.

BRIEF DESCRIPTION OF THE DRAWINGS

Other objects and aspects of the invention will become apparent from the following description of the embodiments with reference to the accompanying drawings, in which.

BEST MODE FOR CARRYING OUT THE INVENTION

A burglarproof apparatus for a data storage disk in accordance with the present invention is implemented that a storage case is not opened without a special unlocking device and is unlocked easily by one touch type in unlocking. The apparatus of an embodiment comprises a storage case 101 equipped with a locking device and an unlocking device 102 for unlocking the locking device.

Figure 1:
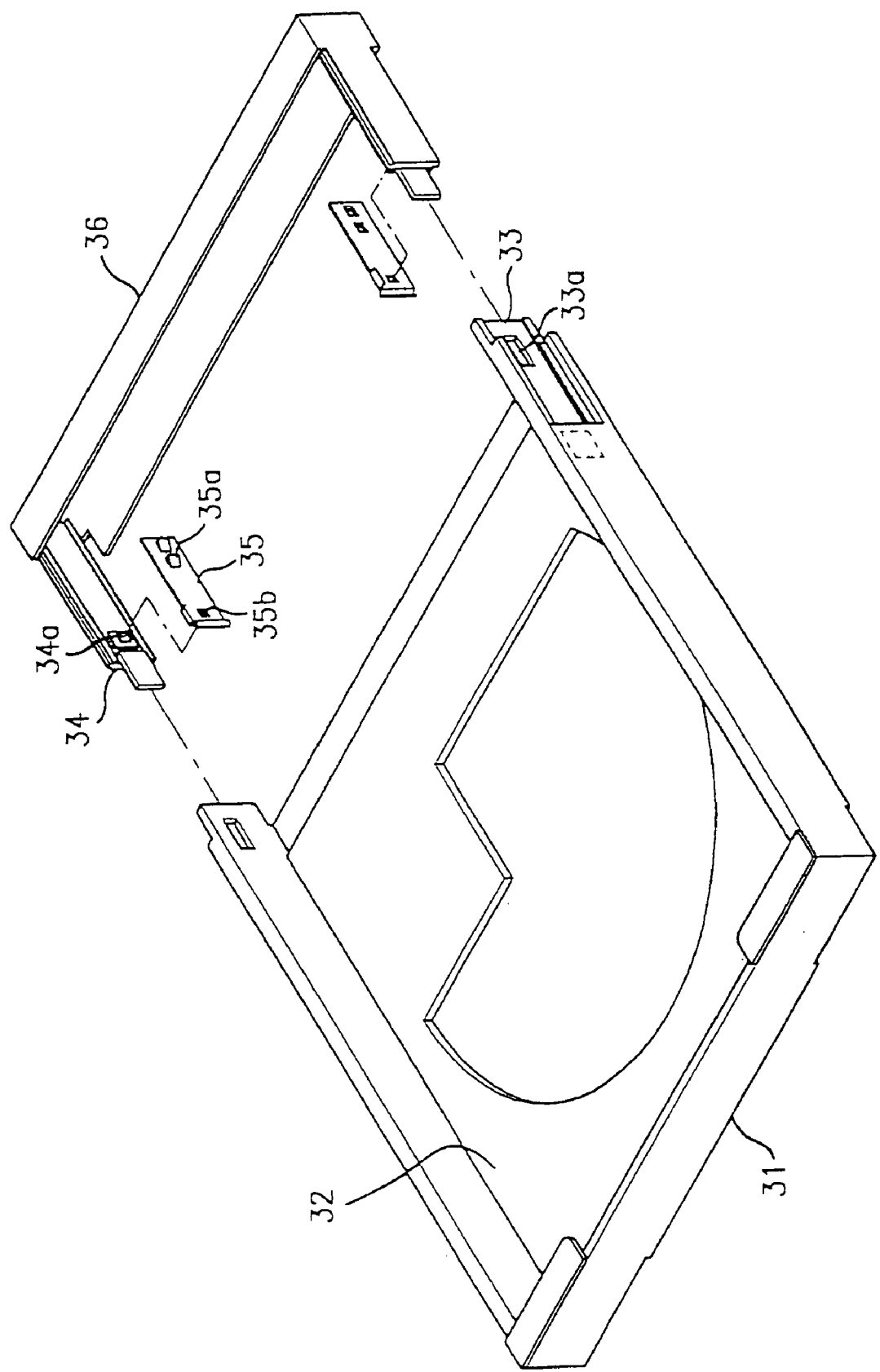
FIG. 1 is a perspective view showing a structure of a conventional burglarproof case for a data storage disk.
Figure 2:
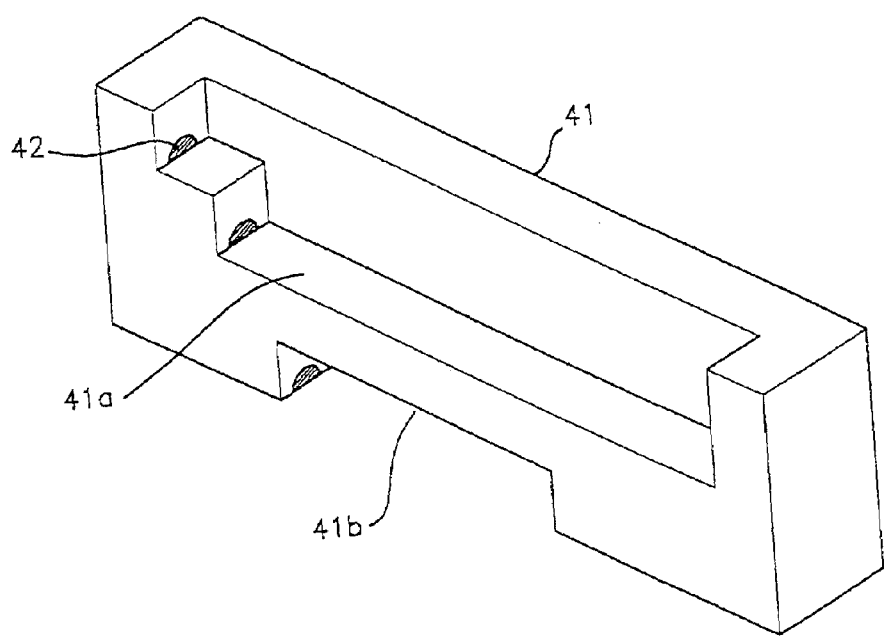
FIG. 2 is a perspective view showing a structure of an unlocking device of the conventional burglarproof case for a data storage disk.
Figure 3A:
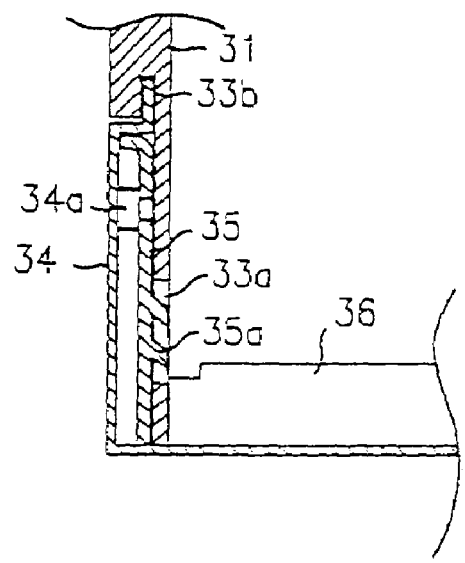
FIGS. 3A and 3B are cross-sectional views showing an unlocking operation state of the unlocking device of the conventional art.
Figure 3B:
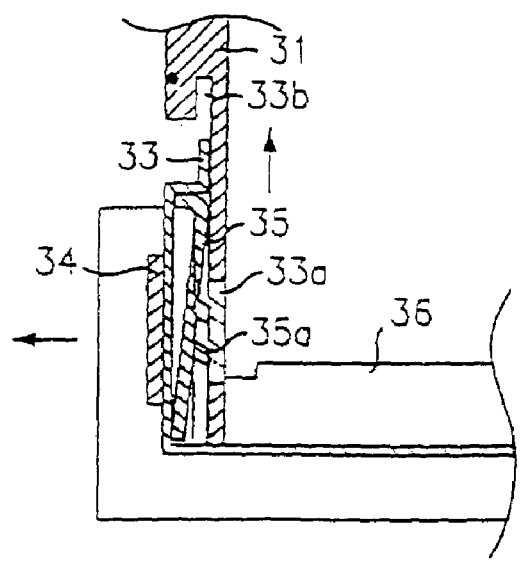
Figure 4:
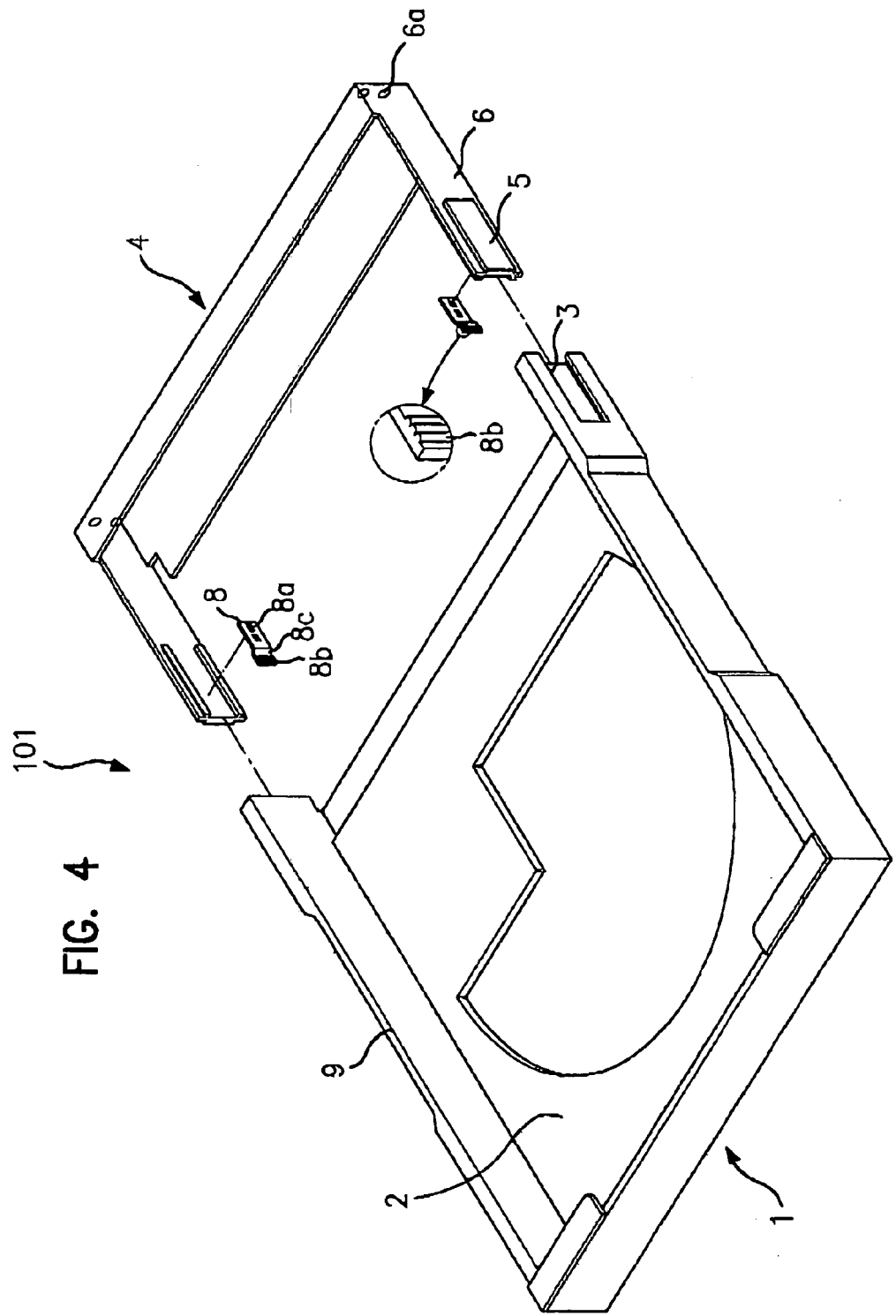
FIG. 4 is a perspective view showing a structure of a burglarproof case for a data storage disk in accordance with a preferred embodiment of the present invention.

As described in FIG. 4, the storage case 101 equipped with the locking device, comprises a housing space 2 for the data storage disk, a case body 1 in which a lock groove 3 is formed on one side of both ends of the case in a lengthwise direction, a cover 4 for supporting and housing a thickness of the data storage disk, a disk holder 6 including a guide rail 5 having a long protrusion in lengthwise direction formed on one side of both ends of the cover 4, for being inserted into the lock groove 3 of the case body 1, and a locking means for controlling a coupling of a disk holder 6 and the case body 1.

Here, the guide rail 5 of the disk holder 6 includes a pair of dovetails 6A, which are protruded in an acute angle, and an standing piece 5B extended to an upper and lower parts of the dovetails 5A on one part of the dovetails 5A. Similarly, the housing groove of the case body has a dovetail groove and a standing guide groove, which are correspondent to the dovetails 5A and the standing piece 5B, respectively.

Figure 5A:
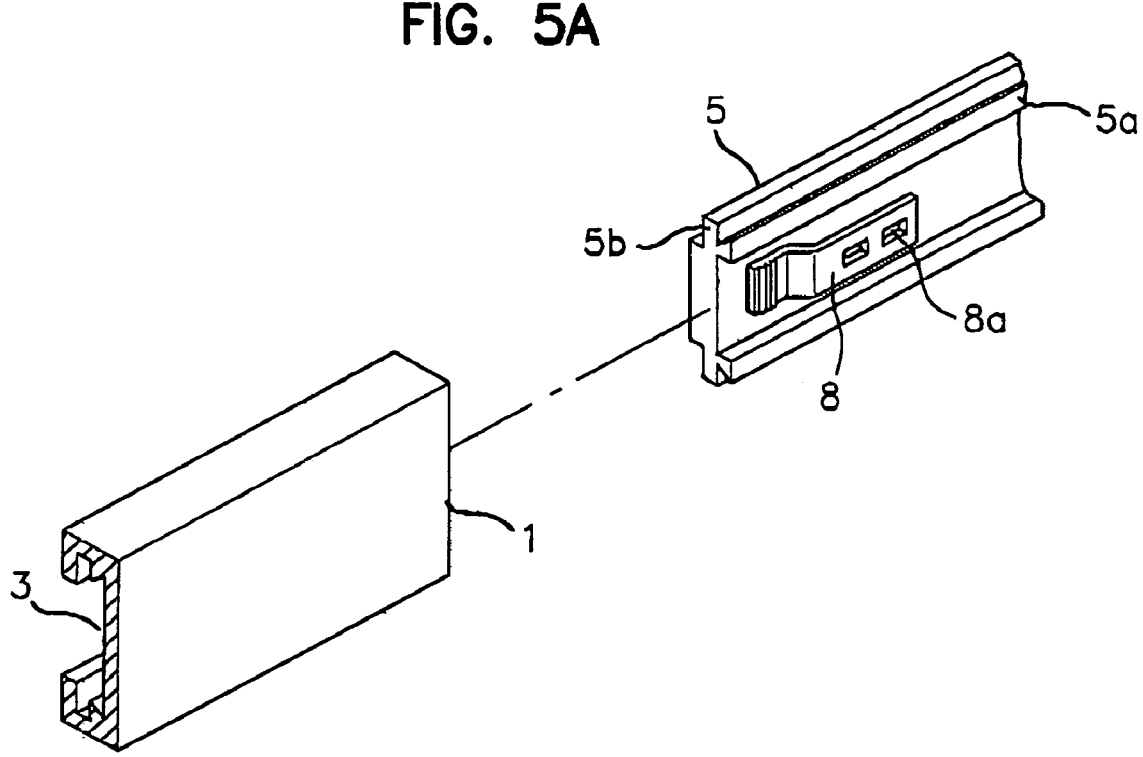
FIG. 5A is a perspective view showing a combination state of a locking device, which is essential to the present invention.
Figure 5B:
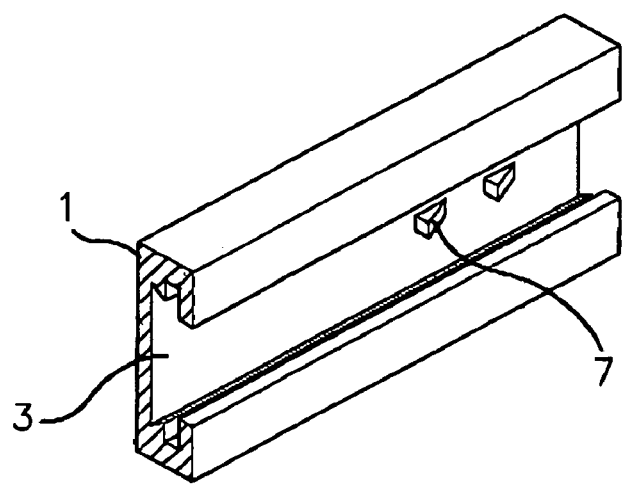
FIG. 5B is a perspective view in a different angle showing a lock groove formed on a case body.
Figure 6:
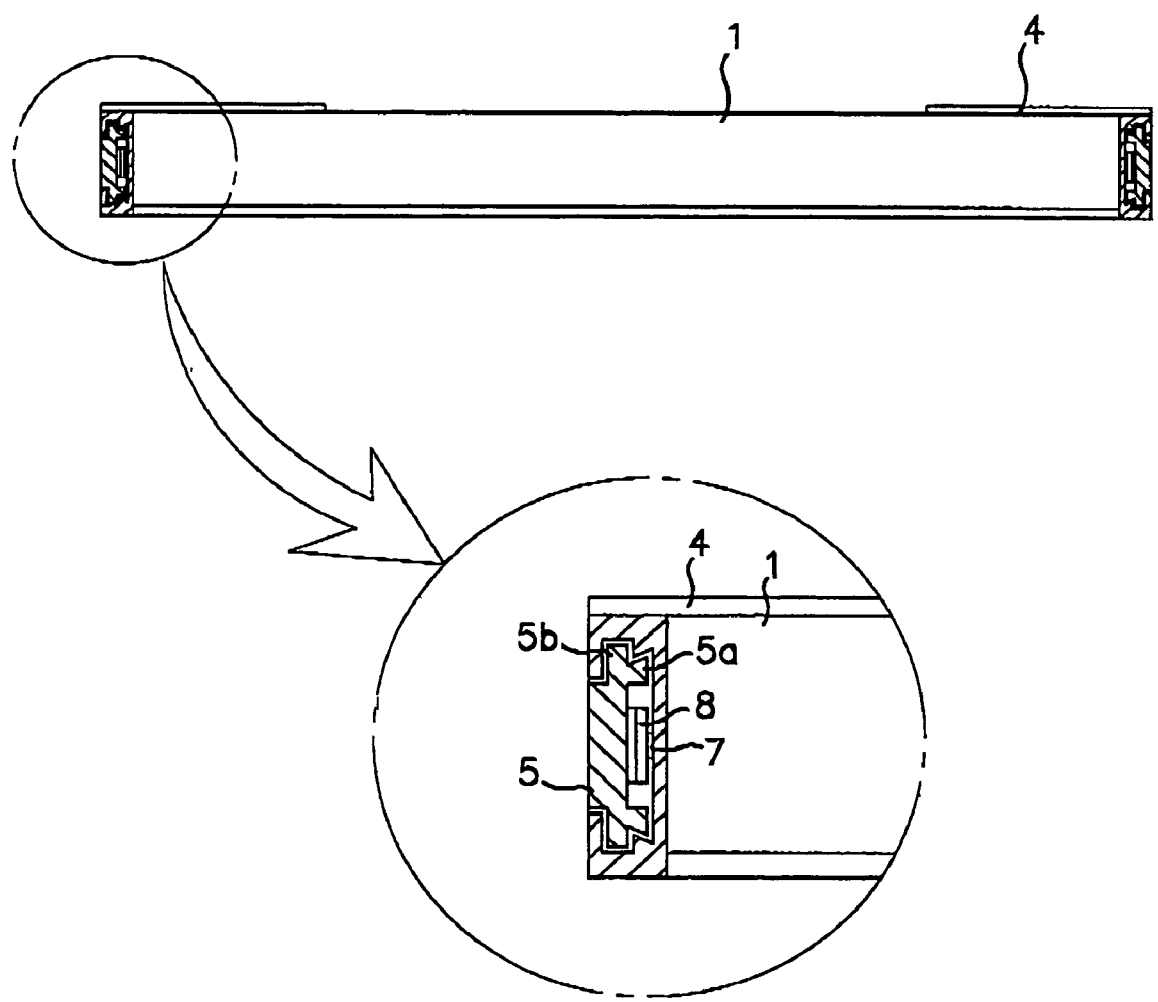
FIG. 6 is a cross-sectional view showing a combination of the lock groove and a guide rail of a disk holder.

As described in FIGS. 5A and 5B, the locking means includes a hanger protrusion 7 mounted on inner face of the lock groove 2, a leaf spring 8 in which a through hole 8A is formed between guide rails 5 of the disk holder 6 for the hanger protrusion 7 being coupled therewith.

In accordance with the preferred embodiment, the hanger protrusion 7 has a shape of a right triangle and is protruded in a direction that the disk holder 6 is inserted into the case body 1. And the leaf spring 8 includes an embossing 8B for being attached ultrasonically with an inner bended piece 8C for being separated from the inner face of the guide rail 5, formed on the other side thereof. Thus, as referred to FIG. 7, in case of coupling the disk holder 6 with the case body 1, a face of the bended piece 8C of the leaf spring 8 slides along a slope of the hanger protrusion 7 shaped as the right triangle a smoothly. After this, the hanger protrusion 7 is inserted into the through hole 8A of the leaf spring 8 and then coupled so that the case becomes locked.

Furthermore, in accordance with the embodiment, the case body 1 has a sunken portion formed in the middle of both outer faces thereof so that an amount of a used material can be reduced.

Figure 7:
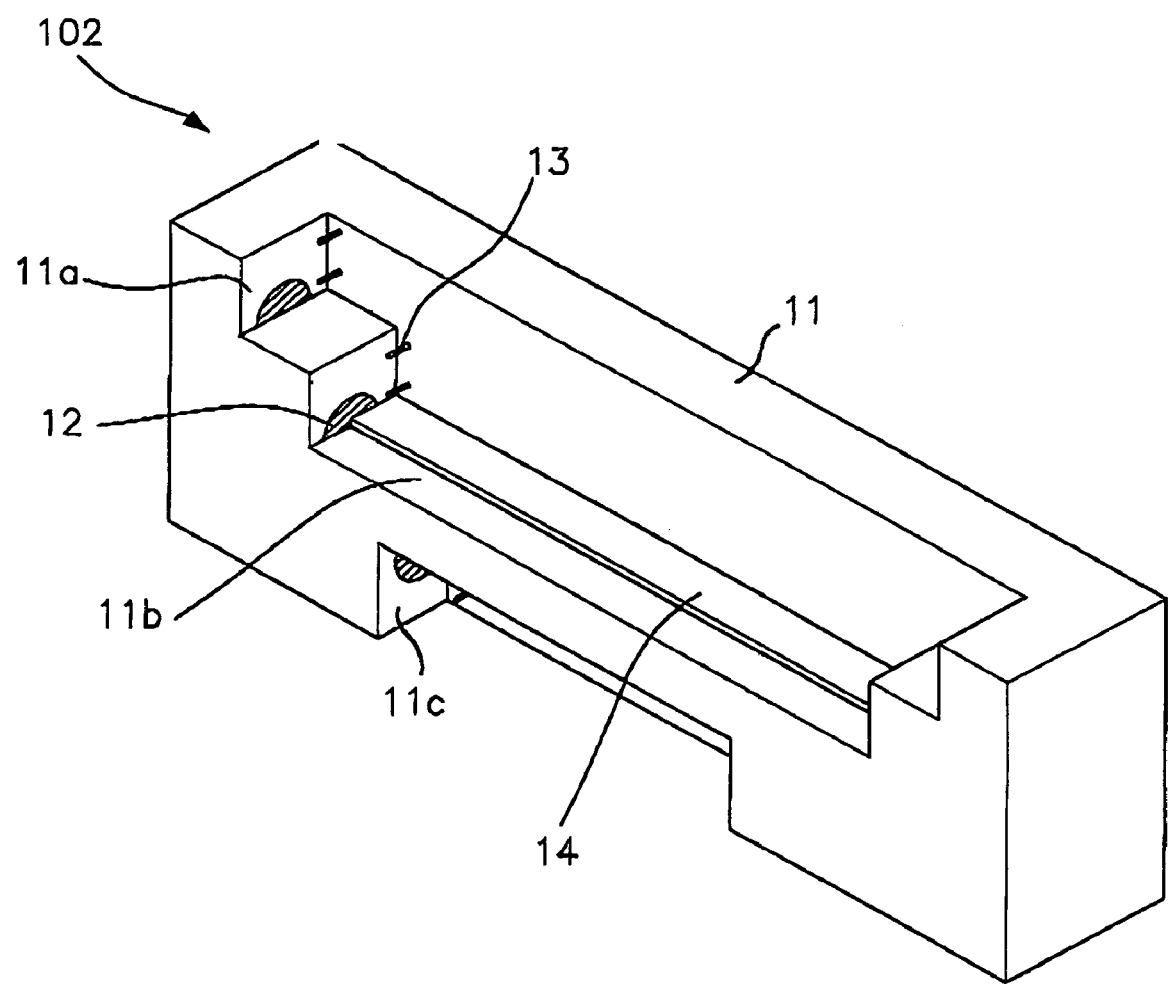
FIG. 7 is a perspective view showing the structure of the locking device of the burglarproof case for the data storage disk of the present invention.

Referring to FIG. 7, there is an unlocking device to unlock the locking device of the case having th structure aforementioned.

As described in this figure, the unlocking device comprises a key block 11 having a housing groove on one side thereof, for housing a width of the disk holder 6, and a magnet 12, disposed on both sides of housing grooves of the key block 11, for unlocking by separating the hanger protrusion 7 from the through hole 8A by supplying a magnetic force to the leaf spring 8 formed on inner face of the guide rail 5.

The key block 11 of the embodiment has a first and a second stepped housing grooves 11A, 11B for housing a single or double case on an upper side thereof, and a third housing groove 11C for housing a width of a tape case in a bottom portion. Here, the single case is to house one disk and the double case is two, wherein the single case is inserted into the first housing groove 11A and the double case into the second one 11B.

Additionally, there is an unlocking pin 13 for supporting the case body 1 when the case body 1 is separated from the disk holder 6 being pressed by an external force, formed in a shape of a protrusion on both front sides of the housing groove of the key block 11. At this time, there is a guide hole A on both rear sides of the disk holder 6 for the unlocking pin 13 penetrating therethrough.

Therefore, in case that the storage case in which the case body 1 and the disk holder 6 are locked by the locking means, is inserted into the second housing groove 11B of the key block 11, the leaf spring 8 is pulled by a magnetic force of the magnet 12 and at the same time, the unlocking pin 13 is inserted into the guide hole 6A of the disk holder 6 so that the unlocking pin is in contact with a face of the case body 1 and the case body 1 can be come out of the disk holder 6.

Figure 10:
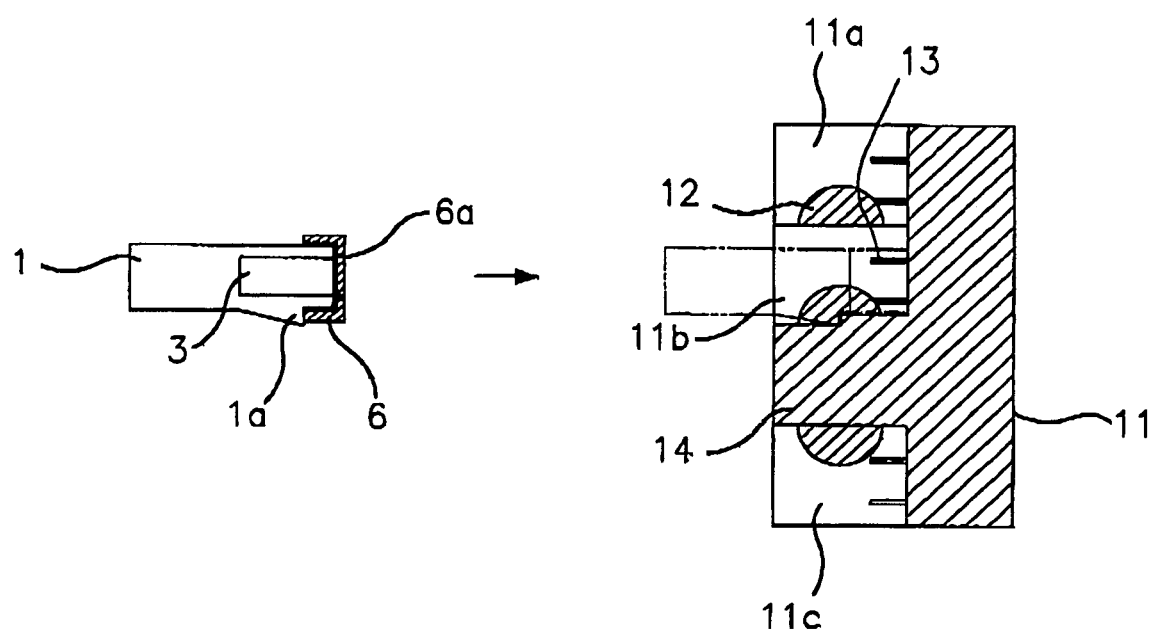
FIG. 10 is a cross-sectional view showing another embodiment with same function as an unlocking pin, which is essential to the present invention.

Besides, referring to FIG. 10, there is provided another embodiment that play a same role of the unlocking pin 13, including a first step 14 formed on a lower part of the case body 1 and a second step 14 formed on the housing groove of the key block 11 facing to the first step 1A. In this figure, there is only a second step 14 on the second housing groove 11B to be matched with the single case, but it is possible to be formed on the first and the second housing grooves. At this time, the size of the second step 14 is designed to be a little larger than the width of the disk holder 6. Hence, if the storage case is inserted into the second housing groove 11B of the key block 11, the first step 1A and the second step is bumped each other so that the case body does not enter anymore. Since the leaf spring 8 is pulled and is unlocked by the magnetic force of the magnet 12, only the disk holder 6 is placed at the second housing groove 11B of the key block 11.

Figure 8A:
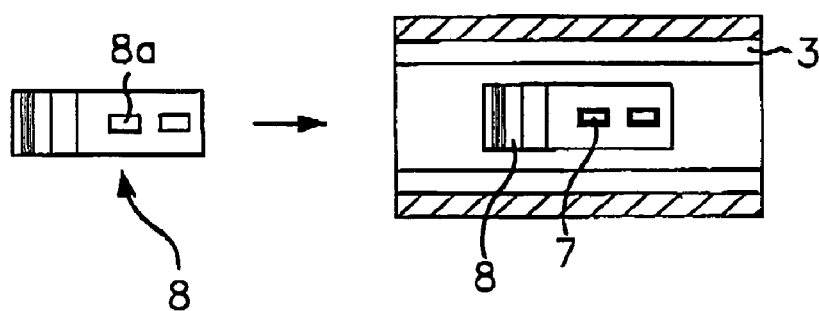
FIGS. 8A and 8B are a front view and a ground view respectively showing a locking operation state of the locking device which is essential to the present invention.
Figure 8B:
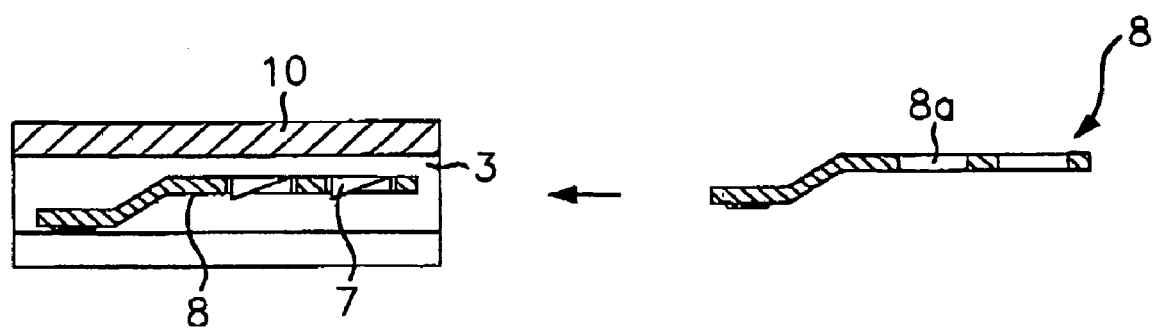
Figure 9A:
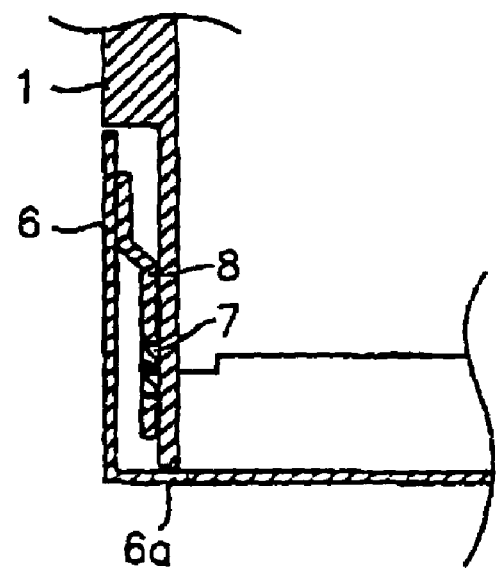
FIGS. 9A and 9B are side views showing an unlocking operation state of the locking device, which is essential to the present invention.
Figure 9B:
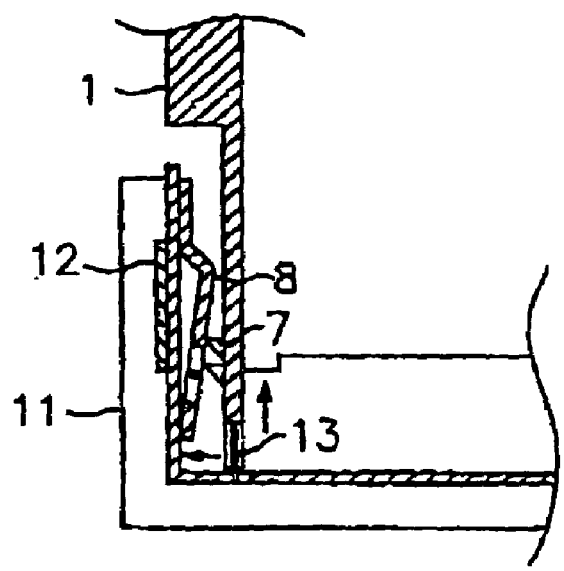

Referring to FIGS. 8 and 9, there is a working state of the present invention having a structure as aforementioned.

Referring to FIGS. 8A and 8B, there is provided a schematic cross-sectional view of locking state by inserting the disk holder 6 into the lock groove 3 of the case body 1. In these figures, there is shown only the lock groove 3 and the leaf spring 8.

As described in the figures, when the guide rail 5 of the dovetail 5A and the standing piece 5B slides to be fitted with the dovetail groove and the standing pieces groove of the lock groove which is formed in the lengthwise direction on both outer faces of the case body 1, the leaf spring 8 mounted on interior of the dovetail 5A slides to cross the hanger protrusion 7 having the shape of the right triangle disposed in the lock groove 3. Under this state, by pushing the side holder to the case body on and on, the hanger protrusion 7 come to be inserted into the through hole 8A of the leaf spring 8, and there is coupled in the end. At this state, even if the disk holder 6 or the case body 1 is pulled or pushed, the storage case is fixed and is not separated because the perpendicular face of the hanger protrusion 7 is contact with the through hole 8A. Thus, the case body 1 and the disk holder 6 is locked firmly, and moreover, a reinforcement force of a locking part is increased because the dovetail and the standing pieces 5A and 5B of the guide rail 5 are inserted into and covered with the dovetail groove and the standing piece guide groove of the lock groove 3.

Referring to FIG. 9, there is illustrated an unlocking operating stat by the locking means under the locking means being operated.

FIG. 9 is a schematic cross-sectional view showing an operating state of the case body 1 being separated from the disk holder 6. As illustrated in this figure, if the storage case in which the locking device is provided is inserted into the housing groove of the key block 11, the unlocking pin 13 is inserted through the guide groove 6A of the disk holder 6 and extends to the housing groove first. According to this, the magnet 12 pulls the leaf spring 8. At this time, the magnet 12 pulls a portion of the through hole 8A of the leaf spring 8 in which the hanger protrusion 7 is inserted, to inside the guide rail 5 so that the locking is unlocked due to the hanger protrusion 7 being separated from the through hole 8A. Then, the case body 1 is bounced up and emerges from disk holder 6 so that it is unnecessary to use a hand for separation.

Figure 11:
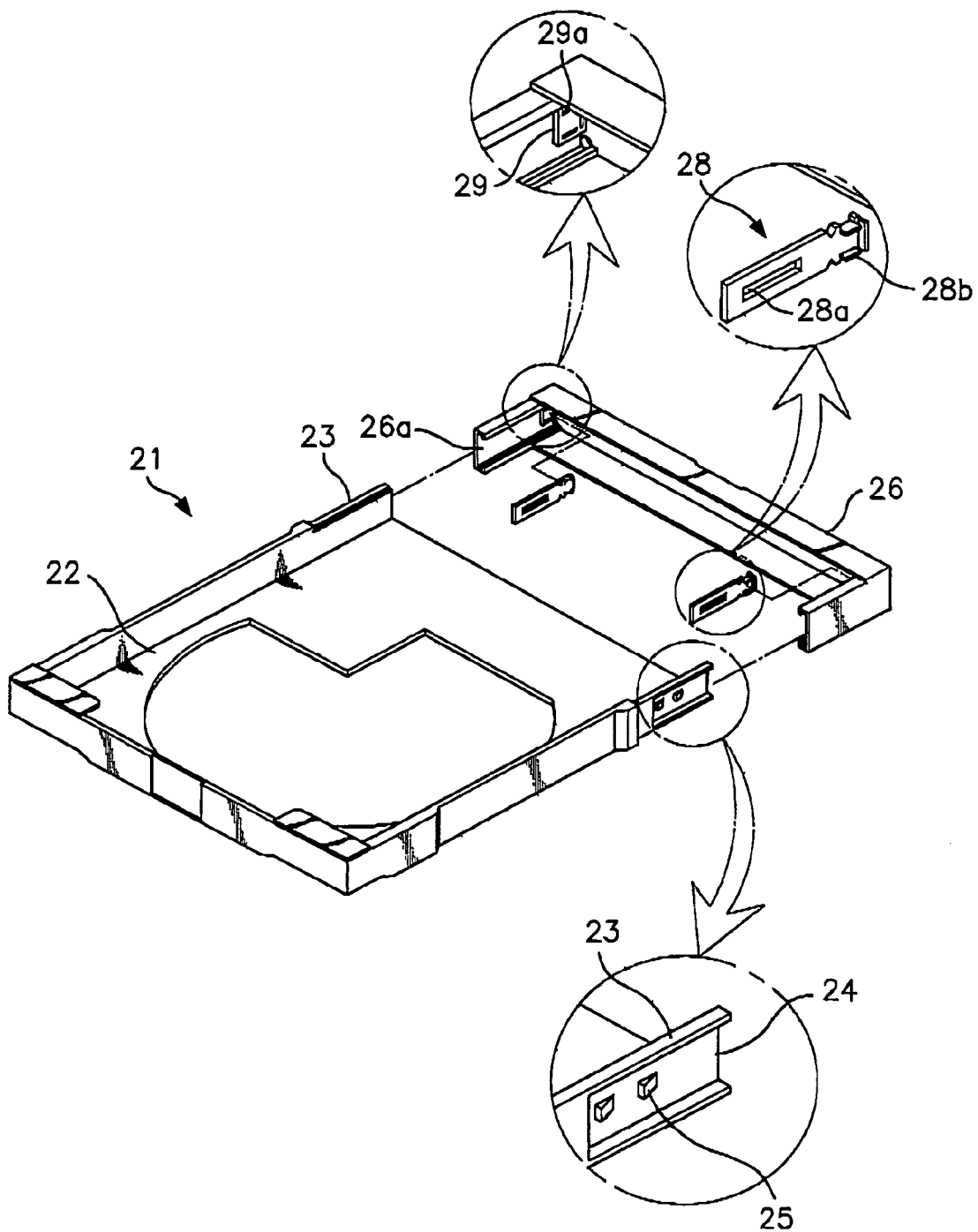
FIG. 11 is a perspective view showing the burglarproof case for the data storage disk in accordance with another preferred embodiment of the present invention.
Figure 12:
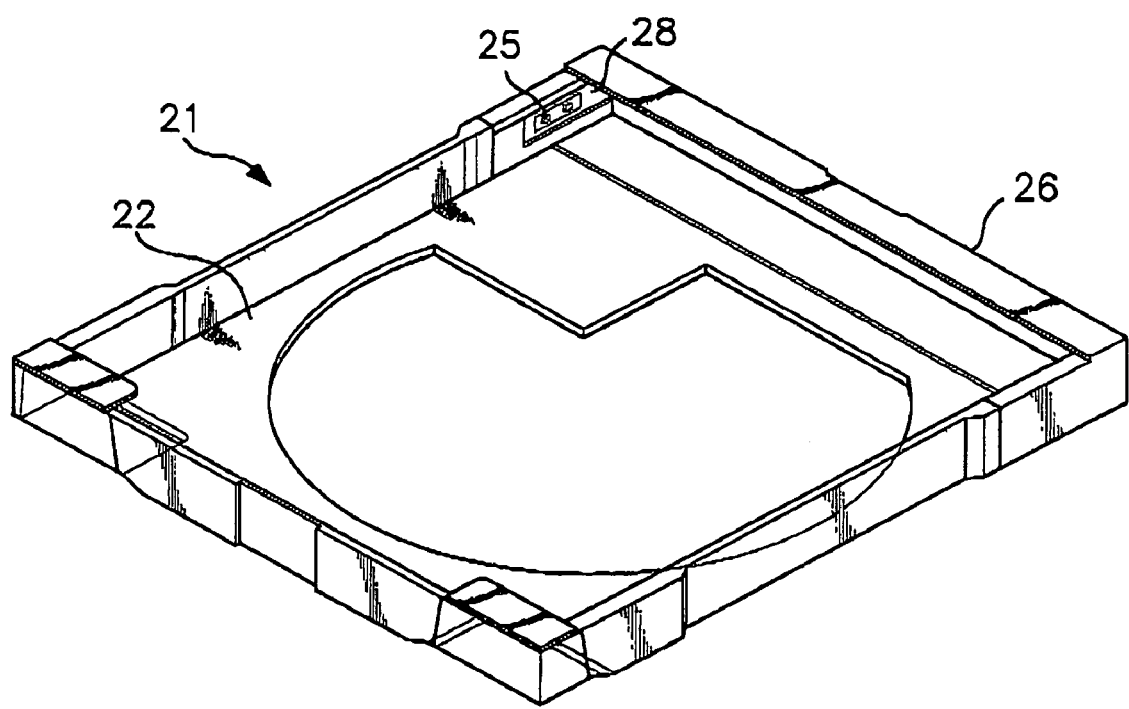
FIG. 12 is a perspective view showing a combination state of the case body and the locking device of the present invention.

Referring to FIGS. 11 and 12, there is provided a structure of the locking apparatus of the burglarproof apparatus for the data storage disk in accordance with another preferred embodiment of the present invention. In this embodiment, the case holder is formed to wrap the locking means completely so that the reinforcement force is maximized. Since the others without the locking means are same to the embodiment as aforementioned, an explanation for the others is abbreviated and only the locking means is illustrated hereinafter.

As described in these figures, a guide rail 23 is formed in a lengthwise direction on both sides of the case body 21 in which a housing space 22 for the data storage disk is formed, and a lock groove 24 is formed on an outer face. Additionally, a hanger protrusion 25 has the shape of a right triangle and is protruded in an insertion direction of the disk holder 26 into the case body 21, formed inside the lock groove 24. A rail groove 26A is formed on both sides of the disk holder 26 corresponding to the guide rail 23 for sliding to couple therewith. A leaf spring 28 is mounted on the inner face of the rail groove 26A wherein a long through hole 28A is formed in a lengthwise direction for locking the hanger protrusion 25. Here, the leaf spring 28 has a bent piece 28B disposed on upper and lower parts thereof as illustrated in FIG. 11, and a fixed piece 29 is formed in which a slot 29A is formed on the upper and lower parts of the rail groove 26A, for the bent piece 28B to be inserted and fixed.

Therefore, as shown in FIG. 12, when the disk holder 26 is inserted into the case body 21, a face of the leaf spring 88 slides along a slope of the hanger protrusion 25 shaped as the right triangle smoothly, and then the guide rail 23 is inserted into the rail groove 26A. After this, the hanger protrusion 25 is inserted into the through hole 8A of the leaf spring 28 and is coupled so that the case becomes locked.

Unlocking the locking means is same to the explanation of operating states as referred to FIG. 9 so that a detail explanation is abbreviated.

While the present invention has been described with respect to certain preferred embodiments only, other modifications and variation may be made without departing from the spirit and scope of the present invention as set forth in the following claims.

What is claimed is:

1. A burglarproof apparatus for a data storage disk, comprising:
    a case body wherein a housing space is formed in a lengthwise direction for the data storage disk and a lock groove is formed on both outer sides thereof;
    a disk holder including a plurality of guide rails for being inserted into the lock groove of the case body, formed on both inner sides thereof, for supporting and housing a width of the data storage disk; and
    a lock that controls an operation of combining the disk holder and the case body, including a hanger protrusion disposed on an inner face of the lock groove, and a leaf spring provided with a through hole between guide rails of the disk holder for locking the hanger protrusion in the through hole,
    wherein one side of the leaf spring is attached to the disk holder and the other side of the leaf spring is formed with a bent shape for separation from the inner face of the guide rail, wherein the guide rails of the disk holder include a pair of dovetails extending from one side thereof and an extended standing piece on portions of the dovetails, and the lock groove of the case body includes dovetail grooves corresponding to the dovetails and a standing guide groove corresponding to the standing piece, and the one side of the leaf spring is attached to an inner face of the guide rail and has an embossing ultrasonically attached with the inner face of the guide rail.

2. The burglarproof apparatus as recited in claim 1, wherein the hanger protrusion of the lock has a shape of a right triangle extending in a direction of insertion of the disk holder into the case body.

3. The burglarproof apparatus as recited in claim 1, further comprising sunken portions on both sides of the case body.

4. The burglarproof apparatus as recited in claim 1, further comprising:
    a key block in which a housing groove is formed, for a width of the disk holder being inserted;
    a magnet, disposed in both sides of the housing groove of the key block corresponding to the width of the disk holder, that unlocks by supplying a pulling force to the locking means when the disk holder is inserted; and
    an unlocking pin, formed in a shape of a protrusion, disposed on a front face of the housing groove of the key block having the direction that the disk holder is inserted, that supports the case body when the case body is separated from the disk holder being pressed by an external force.

5. The burglarproof apparatus as recited in claim 4, wherein the key block includes a first and a second stepped housing groove that houses a single or a double case on an upper part thereof, and a third housing groove that houses a width of a tape case in a bottom portion thereof.

6. A burglarproof apparatus for a data storage disk, comprising:
    a case body in which a housing space is formed, guide rails are formed on one side and a lock groove is formed on the both faces of the guide rails in a lengthwise direction;
    a disk holder in which rail grooves are formed on both sides to couple to the guide rails of the case body;
    a lock that controls an operation of combining the disk holder and the case body, including a hanger protrusion formed inside the lock groove of the case body and a leaf spring being provided with a through hole, one side of the leaf spring being attached to inside the rail groove;
    a key block including a housing groove of a width of the disk holder being inserted;
    a magnet, disposed in both sides of the housing groove of the key block corresponding to the width of the disk holder, that unlocks by supplying a pulling force to the lock when the disk holder is inserted; and
    a support that supports the case body when the case body is separated from the disk holder being pressed by an external force.

7. The burglarproof apparatus as recited in claim 6, the supporting means includes a first step formed in a lower part of the case body and a second step formed in the housing groove of the key block.

8. The burglarproof apparatus as recited in claim 6, further comprising a guide hole formed on both rear sides of the disk holder for unlocking.

9. The burglarproof apparatus as recited in claim 6, wherein the said support disposed on both front sides of the housing groove of the key block in a shape of a protrusion, and includes an unlocking pin penetrating the guide hole of the disk holder in contact with a face of the case body.

* * * * *

UNITED STATES PATENT AND TRADEMARK OFFICE
CERTIFICATE OF CORRECTION

| | | |
|---|---|---|
| PATENT NO. | : 6,931,895 B1 | Page 1 of 1 |
| APPLICATION NO. | : 09/623904 | |
| DATED | : August 23, 2005 | |
| INVENTOR(S) | : J. Y. Ahn | |

It is certified that error appears in the above-identified patent and that said Letters Patent is hereby corrected as shown below:

Column 8,
Line 54, after "wherein" delete "the".

Signed and Sealed this

Twenty-seventh Day of June, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,931,895 B1 | Page 1 of 1 |
| APPLICATION NO. | : 09/622904 | |
| DATED | : August 23, 2005 | |
| INVENTOR(S) | : J. Y. Ahn | |

It is certified that error appears in the above-identified patent and that said Letters Patent is hereby corrected as shown below:

<u>Column 8,</u>
Line 54, after "wherein" delete "the".

This certificate supersedes Certificate of Correction issued June 27, 2006.

Signed and Sealed this

Tenth Day of October, 2006

JON W. DUDAS
*Director of the United States Patent and Trademark Office*